(12) United States Patent
Kitamura et al.

(10) Patent No.: US 6,577,034 B1
(45) Date of Patent: Jun. 10, 2003

(54) GEARED MOTOR

(75) Inventors: Hiroshi Kitamura, Mie (JP); Keita Nakaguro, Kyoto (JP); Masaharu Miyagawa, Osaka (JP); Mizuo Komine, Nara (JP); Shoichi Kubo, Mie (JP); Yukio Chihara, Mie (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/530,889

(22) PCT Filed: Sep. 3, 1999

(86) PCT No.: PCT/JP99/04781

§ 371 (c)(1), (2), (4) Date: Jun. 29, 2000

(87) PCT Pub. No.: WO00/14857

PCT Pub. Date: Mar. 16, 2000

(30) Foreign Application Priority Data

Sep. 4, 1998 (JP) .............................. 10-250753

(51) Int. Cl.⁷ ............................ H02K 5/00; H02K 7/10; H02K 7/116
(52) U.S. Cl. .................. 310/83; 310/66; 310/67 R; 310/75 R; 310/89; 310/90; 310/DIG. 6
(58) Field of Search ...................... 310/83, 89, 75 R, 310/90, DIG. 6, 254, 261, 67 R, 66

(56) References Cited

U.S. PATENT DOCUMENTS

| | | | | |
|---|---|---|---|---|
| 1,089,181 A | * | 3/1914 | Apple | 310/75 R |
| 4,399,380 A | * | 8/1983 | Hirano | 15/250.3 |
| 4,456,805 A | * | 6/1984 | Jorgensen et al. | 108/139 |
| 4,529,900 A | * | 7/1985 | Uzuka | 310/266 |
| 4,616,164 A | * | 10/1986 | Kenny et al. | 318/15 |
| 4,940,322 A | * | 7/1990 | Hamamoto et al. | 307/10.1 |
| 5,479,058 A | * | 12/1995 | Seidou | 310/261 |
| 5,717,265 A | * | 2/1998 | Tukamoto et al. | 310/38 |

FOREIGN PATENT DOCUMENTS

| | | | |
|---|---|---|---|
| GB | 2 159 001 | 11/1985 | H02K/23/68 |
| GB | 2 248 728 | 4/1992 | H02K/7/116 |
| JP | S47-344005 | 12/1972 | |
| JP | S59-172662 | 11/1984 | |
| JP | S62-88450 | 6/1987 | |
| JP | S62-185458 | 11/1987 | |
| JP | S64-30659 | 2/1989 | |
| JP | HO2-103767 | 8/1990 | |
| JP | 2-201826 | 8/1990 | |
| JP | H.2-146966 | 12/1990 | |
| JP | 3-265441 | 11/1991 | |
| JP | HO3-117348 | 12/1991 | |
| JP | HO4-86067 | 7/1992 | |
| JP | HO4-95518 | 8/1992 | |
| JP | 4-282058 | 10/1992 | |
| JP | 4-312338 | 11/1992 | |
| JP | 5-33541 | 2/1993 | |
| JP | 6-54483 | 2/1994 | |
| JP | 09205755 | 8/1997 | |
| JP | 9-327167 | 12/1997 | |
| JP | 10-23711 | 1/1998 | |
| JP | 10155264 | 6/1998 | |

* cited by examiner

*Primary Examiner*—Burton S. Mullins
(74) *Attorney, Agent, or Firm*—RatnerPrestia

(57) ABSTRACT

A spline is provided on a hollow shaft, and the key in the spline can couple directly a shaft to be driven of an external apparatus. Screw blocks rotational torque, thus screw is desirably located as far as possible from output shaft. Although the location is not illustrated, an anti-revolving function is desirably provided on the housing surface at the farthest place from the output shaft so that less force is required for fixedly securing the geared motor.

30 Claims, 3 Drawing Sheets

GEARED MOTOR

This Application is a U.S. National Phase Application of PCT International Application PCT/JP99/04781.

TECHNICAL FIELD

The present invention relates to a geared motor of which housing accommodates a motor and a speed reduction gear therein.

BACKGROUND ART

Geared motors have been used as a driver of every industrial apparatus, therefore, the geared motors have undergone various requests such as an inexpensive cost, smaller body, higher output, higher efficiency, lower noise, longer service-life and the like.

There are two types of geared motors from a structure view of point:

(a) a discrete type: A motor and a speed reduction gear are produced independently, and then they are coupled together.

(b) a unitary type: Parts of a motor and a speed reduction gear are shared with each other.

In the case of the discrete type, the sections to be coupled must be precisely fit into the others, thus the dimensions thereof must be precisely measured. On the other hand, the unitary type is free from a precise fitting, and this is convenient for users. Thus the demand of the unitary type has increased recently.

This unitary type is further classified into a cylindrical model and a housing model. A conventional geared motor of the cylindrical model in the unitary type is hereinafter described.

In FIG. 5, speed reduction gear 52 includes a reduction mechanism in a case. Induction motor 51 and speed reduction gear 52 are assembled into a geared motor. An shaft of induction motor 51 is coupled to speed reduction gear 52 with an orthogonal gear such as a hypoid gear, and the speed is reduced by the speed reduction gear, then an output shaft is driven.

In this structure, the geared motor includes a large cylindrical induction motor in its longitudinal direction, so that a part of the motor lies substantially off the case of the speed reduction gear. As a result, the shape of face to which the induction motor is mounted has some restriction, therefore, dimensions related to the mounting could not be downsized. When the geared motor shown in FIG. 5 is mounted to an apparatus, a shaft to be driven of the apparatus is coupled to an output shaft of the geared motor, and yet, an anti revolving device of the motor is required.

Since the geared motor as shown in FIG. 5 has a cylindrical motor, the anti-revolving device cannot be mounted on the outer face of the motor, thus anti-revolving-plate 53 is independently required.

As one of the advantages of this direct coupling to the section to be driven, the shape of the motor should not stick out from the apparatus when the motor is mounted to the outer wall of the apparatus, and a thinner body in axial direction is particularly demanded.

The European market and the food industry among others demand dust-proof and waterproof functions on apparatuses, thus the apparatuses need motors free from covers and yet keep dust-proofing as well as waterproofing.

The conventional cylindrical geared motor needs a seal on the speed reduction gear per se in addition to another seal on the coupling section between the speed reduction gear and the motor for dust-proofing and waterproofing. However, this structure still does not provide perfect dust-proof or waterproof function.

Further, a speed control function on the geared motor side has been required because the apparatuses have been recently demanded to have higher and more versatile functions. The geared motor thus desirably has a control circuit therein. As a result, new requirements such as preparing a space for the circuit, dust-proof and waterproof functions for the circuit arise.

The present invention addresses these problems discussed above and aims to provide a downsized geared motor in a slim body with excellent maneuverbility and strict air-tightness.

SUMMARY OF THE INVENTION

A geared motor of the present invention comprises the following elements in order to solve the problems discussed above:

an approx. rectangular housing; and a motor and a speed reduction gear situated in the housing, the geared motor is characterized in that: a hollow-output-shaft of the speed reduction gear is directly coupled to a shaft to be driven of an external apparatus, and the external apparatus holds an outer circumference of the housing.

A geared motor of the present invention comprises the following elements:

an approx. rectangular housing; and a motor and a speed reduction gear situated in the housing, the geared motor is characterized in that: the speed reduction gear has a hollow output shaft and the housing has an anti-revolving function.

A geared motor of the present invention is characterized in that: a motor bracket—holding a bearing which journals an output shaft of the motor—holds a bearing of a speed reduction gear having parallel shafts. The bearing of the speed reduction gear is disposed inside of the brush-less motor in an axial direction free from interfering with the motor coil.

A geared motor of the present invention is characterized in that the housing is divided in a direction orthogonal to an output shaft, and the faces divided are sealed with sealing member.

A geared motor of the present invention is characterized in that: a circuit of the motor is mounted on a side face of the housing or within the housing.

A geared motor in accordance with an exemplary embodiment of the present invention is characterized in that: the anti-revolving function is formed by at least one of a screw section, recess section, or protruded section.

A geared motor in accordance with an exemplary embodiment of the present invention is characterized in that: the anti-revolving function is provided at the farthest place on the surface of the housing from the output shaft, and is disposed parallel with the output shaft.

A geared motor of the present invention comprises the following elements:

an approx. rectangular housing; and a motor and a speed reduction gear situated in the housing, the geared motor is characterized in that: both of a brush-less motor having concentrated windings on each tooth of the stator iron and a motor bracket holding a bearing, which journals an output shaft of the brush-less motor, hold the bearing of the speed reduction gear having parallel shafts, and the bearing of the speed reduction gear is disposed inside of the brush-less motor in an axial direction free from interfering with the motor coil.

A geared motor in accordance with an exemplary embodiment of the present invention is characterized in that: an idle gear is used for torque transmission between an output shaft gear of the motor and a first stage gear of the speed reduction gear, and the main purpose of the idle gear is not speed reduction.

A geared motor of the present invention comprises the following elements:
an approx. rectangular housing; and
a motor and a speed reduction gear situated in the housing,
the geared motor is characterized in that: the housing is divided in a direction orthogonal to an output shaft, and the faces divided are sealed with sealing member.

A geared motor of the present invention in accordance with an exemplary embodiment of the present invention is characterized in that: grooves are provided on the divided faces, and viscous sealing member is applied to the grooves.

A geared motor of the present invention in accordance with an exemplary embodiment of the present invention is characterized in that: a terminal box for powering the motor is provided on a face other than the face used for mounting the housing.

A geared motor of the present invention comprises the following elements:
an approx. rectangular housing; and
a motor and a speed reduction gear situated in the housing,
the geared motor is characterized in that: a circuit of the motor is mounted on a side face of the housing or within the housing.

As such, when the hollow shaft of the speed reduction gear is directly coupled to the shaft to be driven of the external apparatus, the geared motor can be mounted to the external apparatus by just holding the outer circumference of the housing.

This geared motor has an anti-revolving function on the housing, so that the hollow shaft and the shaft to be driven of the apparatus are directly coupled. This structure improves the mountability to the apparatus.

The anti-revolving function is provided at the farthest place on the housing from the output shaft, so that less force is required to fixedly secure the geared motor.

Since the bearing of speed reduction gear is disposed inside the brush-less motor in the axial direction and free from interfering with the motor coils, the housing width of the geared motor in axial direction can be shortened.

The housing accommodating the motor and the speed reduction gear is divided and the divided faces of housing are sealed. This is a simple sealing structure and yet this seal functions as dust-proofing as well as waterproofing.

A terminal box is disposed on a face other than the face used for mounting the housing, thus the mountability is improved.

Further, the circuit is mounted on a side face of the housing or within the housing, the housing functions as a radiator of the circuit.

DETAILED DESCRIPTION OF EXEMPLARY EMBODIMENT

Next, a geared motor of a housing model is described based on the Japanese Patent Application No. H10-250753 by the same applicant of the present invention.

Figure 6:
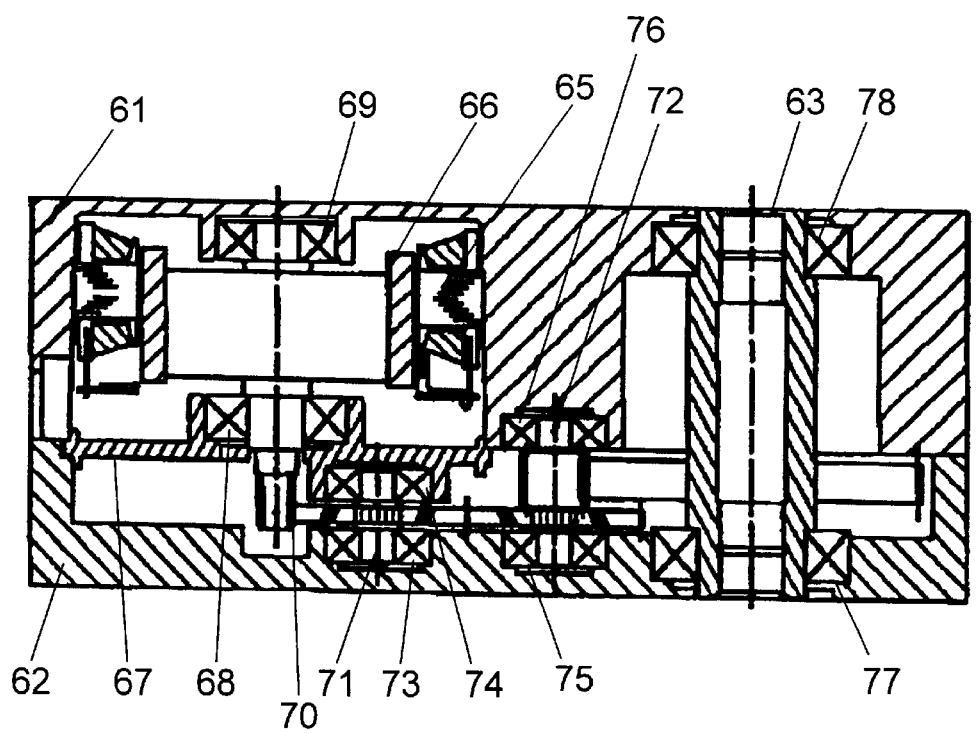
FIG. 6 is a cross section illustrating a geared motor of a prior patent application.

In FIG. 6, approx. rectangles 61 and 62 are housing and also casing of a brush-less motor and a speed reduction gear. A brush-less motor comprises stator 65, rotor magnet 66, bracket 67, bearings 68 and 69, and shaft 70 of the motor. A speed reduction gear comprises hollow-output-shaft 64, intermediate gear-assembling shafts 71, 72, bearings 73, 74, 75, 76, 77, 78 of the speed reduction gear, and housings 61, 62.

On housing 61, four mounting holes (not shown) for mounting the motor to an apparatus are provided around hollow-output-shaft 64.

Shaft 70 of the brush-less motor, output shaft 64 of the speed reduction gear, and intermediate shafts 71, 72 are disposed in parallel, so that a helical gear and a spur gear reduce the speed between these respective shafts. As a result, an efficiency of torque-transmission is improved comparing with a case using an orthogonal shaft. A helical gear, in particular, employed to the shaft of the brush-less motor contributes to noise reduction.

However, better maneuverbility, smaller size, thinner body, and stricter air-tightness are still required, and the structure discussed above is not sufficient to meet these requirements.

A geared motor having a hollow-output-shaft can be directly coupled with a section to be driven of an apparatus by inserting a shaft to be driven of the apparatus directly into the hollow shaft. This structure eliminates mounting components such as couplings, and also a work of centering the output shaft of the geared motor with the driven shaft. Further, this structure allows the apparatus to be in a unit-construction, downsized, and less-weight. With these advantages, this geared motor has been recently employed to various apparatuses; however, this structure needs an anti-revolving device in coupling the motor to the driven-shaft of apparatus. Further improvements are provided to overcome the problems discussed above, and those improvements are demonstrated in the following embodiments.

(Exemplary Embodiment 1)

Figure 1:
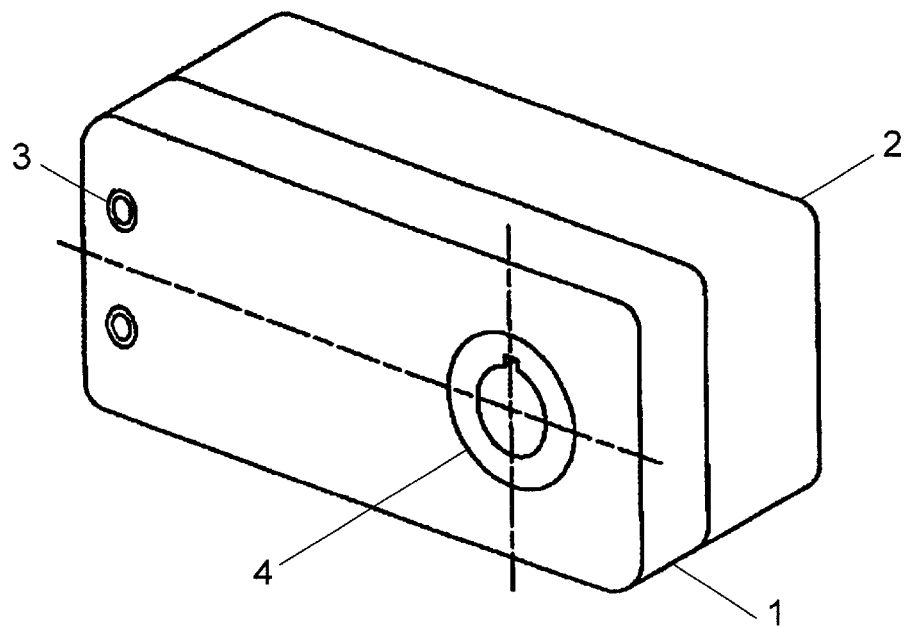
FIG. 1 is a perspective view of a geared motor in accordance with a first exemplary embodiment of the present invention.

In FIG. 1, housings 1, 2 are in approx. rectangular shape, and a screw 3 of anti-revolving function is disposed on housings 1 and 2. Output shaft 4 of the speed reduction gear is hollow. A spline is provided on a hollow shaft 4. The key in the spline can couple the hollow haft 4 to the shaft to be driven of an external apparatus. Screw 3 receives rotational torque, and thus screw 3 is desirably disposed at the farthest place from output shaft 4. The anti-revolving function is desirably disposed at the farthest place on the housing from the output shaft, though it is not shown in the drawing, the less force is required to fixedly secure the geared motor.

Figure 5:
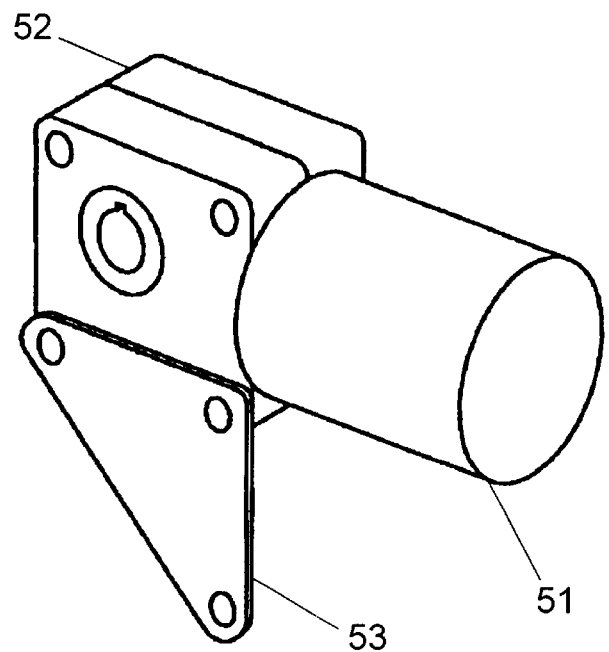
FIG. 5 is a perspective view of a conventional geared motor.

This screw 3 replaces anti-revolving-plate 53 conventionally used and shown in FIG. 5, so that a number of components and a number of mounting process can be reduced. The maneuverbility is thus substantially improved. Instead of the screw, a recess section or a protruded section can function as an anti-revolving device. These respective devices can be disposed far from the output shaft, and these devices can be combined.

When screw 3 is not provided, an output of the geared motor can be transmitted to an external apparatus by closely contacting the outer circumference of housings 1, 2 to the external apparatus, or by holding the outer circumference of housings 1, 2 with the external apparatus (not shown).

(Exemplary Embodiment 2)

Figure 2:
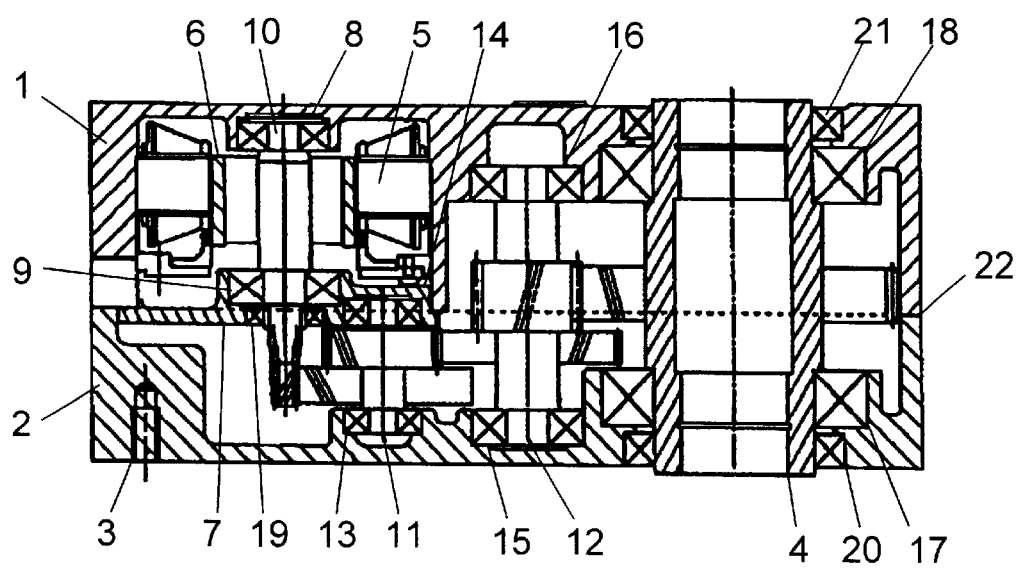
FIG. 2 is a cross section illustrating a geared motor in accordance with a second exemplar embodiment of the present invention.

In FIG. 2, housings 1, 2 also function as casings of a brush-less motor and a speed reduction gear. The brush-less motor comprises stator 5, rotor-magnet 6, bracket 7, bearings 8, 9, and shaft 10. The speed reduction gear comprises hollow-output-shaft 4, intermediate-gear-assembling-shafts 11, 12 including a helical gear as well as a spur gear, bearings 13, 14, 15, 16, 17, 18, oil-seal 19, 20, 21 and housings 1, 2. Screw 3 is disposed free from interfering with internal gears.

Bracket 7 comprises a bearing of motor shaft 10 and a bearing of intermediate shaft 11, and stator 5 of the brush-less motor within the housing has an iron core. The iron core comes with concentrated windings (not shown), and is split in the radial direction, so that a high magnetic flux density is achieved. The rotor is made of magnet of neodymium-iron system, so that a high magnetic flux density is achieved.

This structure allows the motor-windings to be slim, and the bearing of the speed reduction gear to be disposed inside of the brush-less motor in axial direction thereby being free from interfering with the motor windings. As a result, the width of geared motor in the axial direction can be reduced by the thickness of the bearing, so that a space for mounting the motor can be saved and the weight of the geared motor can be reduced.

When the geared motor can be slimmed in the direction of the output shaft, the motor can be accommodated in the apparatus, and even if the motor is mounted on a side face of the apparatus, a protruded space from the apparatus due to this mounting can be reduced.

In this embodiment, the speed reduction gear is separated into a driven gear and a driving gear; however, an idle gear can replace the speed reduction gear for torque transmission. In this case, a main purpose of the idle gear is not speed reduction.

Housings 1, 2 are divided into two with divided faces 22 in a direction orthogonal to output shaft 4. Divided faces 22 are sealed by sealing member. The sealing member may be viscous seating member or sheet-like sealing member. When liquid sealing member as viscous sealing member is used, grooves on one of faces 22 would help the liquid sealing member to flow along the groove, so that the sealing member can be applied with ease.

The divided face can be formed by one plane, and the sealing member in the grooves and the sealing member overflowing the grooves can maintain a thickness of the sealing, thereby forming more reliable dust-proof and waterproof structure.

As a result, a geared motor featuring a high efficiency, a space-saving, reliable dust-proofing and waterproofing, and easy-to-mount can be achieved.

(Exemplary Embodiment 3)

Figure 3:
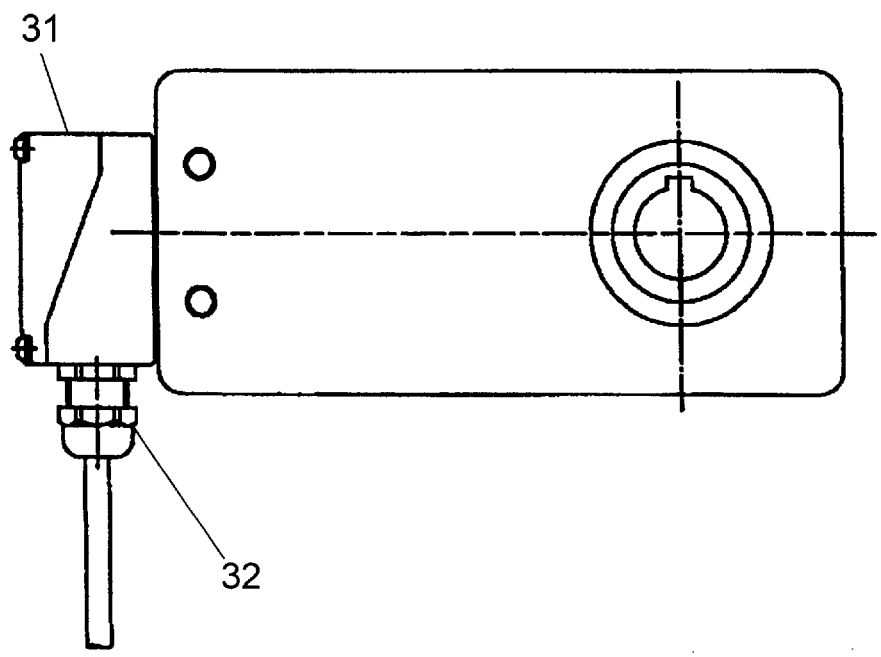
FIG. 3 is a plan view of a geared motor in accordance with a third exemplary embodiment of the present invention.

In FIG. 3, terminal box 31 is provided at a leading-out section of the housing, where a lead-wire of the motor is led out, and terminal box 31 has dust-proof and waterproof structure. Cable ground 32 is provided with a waterproof structure, and can be coupled to terminal box 31 through cable with ease. The sealing structure illustrated in FIG. 2 together with the structure of cable ground 32 can enhance the effects of dust-proofing and waterproofing.

Since the housings are shaped in approx. rectangles, the flat face thereof can be a plane for mounting the terminal box. This structure allows the terminal box to be mounted with reliable sealing. The plane was conventionally attached to the geared motor separately for mounting the terminal box onto the cylindrical motor.

(Exemplary Embodiment 4)

Figure 4:
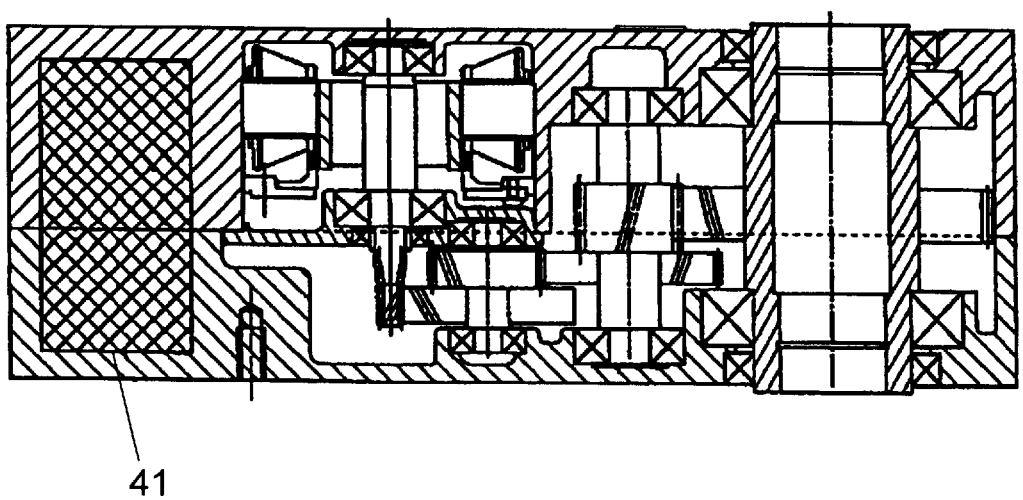
FIG. 4 is a cross section illustrating a geared motor in accordance with a four exemplary embodiment of the present invention.

In FIG. 4, circuit 41 is disposed in the housing, and the coupling section between the motor and circuit 41 is within the housing, thus dust-proofing and waterproofing can be assured by considering only the seal of the housing. Regarding the wire-routing for powering the circuit, the structure of the terminal box shown in FIG. 3 can be used so that a geared motor incorporating the circuit therein with dust-proof and waterproof functions can be achieved.

This structure allows the geared motor to couple directly the motor with the circuit within the housing, so that noise-withstanding, which has been a problem due to routing an intermediate cables, can be substantially improved.

Further, the housing also functions as a radiator of the circuit, so that a temperature rise can be restrained. When an application of this geared motor does not need dust-proof or waterproof function, the circuit can be mounted on a side face of the geared motor housing. In this case, the motor is not anymore in a cylindrical shape, so that the circuit can be mounted with ease.

Industrial Applicability

The present invention as defined in claim 1 allows the geared motor to be easy-to-operate, and mounted to an external apparatus just by holding the outer circumference of the geared motor with the external apparatus.

The geared motor as defined in claims 2, 3, 4 allows the hollow shaft to be coupled directly to a shaft to be driven of the apparatus just by providing at least one of a screw, recess section or protruded section on the housing face as an anti-revolving function. This structure allows the geared motor to be mounted with ease.

The geared motor as defined in claims 5, 6 allows the housing accommodating the motor and speed reduction gear to be slimmed in the output shaft direction, so that the motor can be mounted to the apparatus with ease and the apparatus can be downsized.

The geared motor as defined in claims 7, 8, 9 allows both of the motor and speed reduction gear to be sealed just by sealing the divided faces of the housing, so that the geared motor with dust-proof and waterproof functions can be achievable. The motor also can be mounted to the apparatus with ease.

The geared motor as defined in claim 10 allows the motor to withstand more noises, and radiate heat of the circuit from the housing. As a result, a temperature rise can be restrained. The geared motor can be mounted to the apparatus with ease, and the motor incorporating the circuit is achieved.

What is claimed is:

1. A geared motor comprising:
a housing; a motor disposed in said housing and having a motor shaft; and a speed reduction gear which is an external gear disposed in said housing and having a speed reduction shaft which is in parallel to said motor shaft, wherein said speed reduction gear includes a hollow output shaft coupled directly to a shaft of an external apparatus to drive the external apparatus shaft, and an outer circumference of said housing is held securely by the external apparatus.

2. The geared motor of claim 1, wherein when the outer circumference of said housing is held securely by the external apparatus, the housing is prevented from revolving.

3. The geared motor of claim 1, wherein the housing is divided into first and second parts.

4. The geared motor of claim 1, wherein the motor has an output shaft and wherein the output shaft of the motor is parallel to the hollow output shaft of the speed reduction gear.

5. A geared motor comprising:

a housing;

a motor disposed in said housing and having a motor shaft; and a speed reduction gear which is an external gear disposed in said housing and having a speed reduction shaft which is in parallel to said motor shaft, wherein said speed reduction gear includes a hollow output shaft, and said housing is mounted in close contact with an apparatus to prevent rotation of said motor.

6. The geared motor as defined in claim 5, wherein said housing is secured by at least one of a screw, a recess section, and a protruded section to prevent rotation of said motor.

7. The geared motor as defined in claim 6, wherein prevention of rotation of said motor is accomplished at an axis configured parallel to the output shaft, and which is disposed at a farthest place on said housing from the output shaft.

8. The geared motor of claim 5, wherein the housing is divided into first and second parts.

9. The geared motor of claim 5, wherein the motor has an output shaft and wherein the output shaft of the motor is parallel to the hollow output shaft of the speed reduction gear.

10. A geared motor comprising:

a housing;

a motor disposed in said housing; and a speed reduction gear which is one of a plurality of external gears disposed in said housing, wherein a brush-less motor having a stator iron core of which each tooth is provided with a concentrated winding, along with a motor bracket holding a bearing which journals an output shaft of the brushless motor, and the bearing of the speed reduction gear is disposed within the brushless motor in an axial direction of said output shaft for being free from interfering with a winding of said motor.

11. The geared motor as defined in claim 10, wherein an idle gear is used for transmitting torque between an output shaft gear of said motor and a first stage gear of said speed reduction gear.

12. The geared motor of claim 10, wherein the housing is divided into a first part and a second part.

13. The geared motor of claim 12, wherein the bearing of the speed reduction gear includes a plurality of bearings and wherein the plurality of bearings are placed on one of the first part and the second part of said housing.

14. A geared motor comprising:

an approximately rectangular housing; and a motor and a speed reduction gear disposed in said housing, wherein said geared motor includes:

a circuit which is disposed either on a face of said housing or within said housing.

15. A geared motor comprising:

an approximately rectangular housing; and a brush-less motor and a speed reduction gear which is an external gear disposed in said housing, wherein said geared motor is characterized in that:

a shaft of the brushless motor and a hollow shaft of the speed reduction gear are disposed in parallel.

16. The geared motor of claim 15, wherein the approximately rectangular housing is divided into a first part and a second part.

17. The geared motor of claim 16, wherein the speed reduction gear includes a plurality of bearings, and wherein the bearings are placed on one of the first part and the second part of the approximately rectangular housing.

18. A geared motor comprising:

an approximately rectangular housing; and a brush-less motor and a speed reduction gear which is an external gear disposed in said housing, wherein said geared motor is characterized in that:

a shaft of the brushless motor and a hollow shaft of the speed reduction gear are disposed in parallel, wherein the brushless motor comprises:

a stator including an iron core divided in a radial direction wherein each divided core is provided with a concentrated winding and the divided cores are integrated into the stator; and a rotor, wherein said speed reduction gear comprises:

a helical gear and a spur gear for reducing a speed, said speed reduction gear supplying a reduced speed to said shaft of said speed reduction gear, wherein said shaft is an output shaft.

19. The geared motor as defined in claim 18, wherein the output shaft is hollow.

20. A geared motor comprising:

a housing;

a motor mounted within said housing and having a motor output shaft;

a hollow driven output shaft mounted within said housing, disposed parallel to said motor output shaft, and having a hollow portion facing outward of said housing; and a speed reduction gear unit, including an external gear which is one of a plurality of external gears mounted within said housing and disposed between said motor output shaft and said driven output shaft.

21. The geared motor as defined by claim 20 further including anti-rotation means for preventing rotation of said housing.

22. The geared motor as defined by claim 21 wherein said anti-rotation means prevents rotation of said motor at an axis configured parallel to said driven output shaft, and is located on said housing remote from said driven output shaft.

23. A geared motor as defined by claim 20 wherein said housing is rectangular in cross-section and has first and second parts that are joined together along surfaces that are in planes orthogonal to the disposition of said motor output shaft and said driven output shaft.

24. A geared motor as defined by claim 23 further including a sealing member between said surfaces of said housing along which said first and said second parts of said housing are joined.

25. A geared motor as defined by claim 23, wherein the speed reduction gear includes a plurality of bearings, and wherein the bearings are placed on one of the first and second parts of said housing.

26. The geared motor of claim 20, wherein the outer circumference of said housing is held securely.

27. A geared motor comprising:

an approximately rectangular housing; and a brush-less motor and a speed reduction gear which is an external gear disposed in said housing, wherein said geared motor is characterized in that:
  a shaft of the brushless motor and a hollows shaft of the speed reduction gear are disposed in parallel, and
  (a) said motor includes:
    (1) a stator, and
    (2) a rotor, and
  (b) said speed reduction gear unit includes:
    (1) a helical gear, and
    (2) a spur gear.

28. The geared motor as defined by claim 27 wherein said driven output shaft is hollow.

29. The geared motor as defined by claim 28 wherein said driven output shaft is adapted to be coupled directly to an external apparatus.

30. The geared motor as defined by claim 27 further including:
  (a) a bracket attached to said housing,
  (b) a first bearing mounted to said bracket through which said motor output shaft extends,
  (c) a second bearing mounted to said housing through which said motor output shaft extends,
  (d) a first intermediate shaft disposed parallel to said motor output shaft and said driven output shaft and on which said helical gear is mounted,
  (e) a second intermediate shaft disposed parallel to said motor output shaft and said driven output shaft and on which said spur gear is mounted,
  (f) a third bearing mounted to said housing through which said first intermediate shaft extends,
  (g) a fourth bearing mounted to said bracket through which said first intermediate shaft extends,
  (h) a fifth bearing mounted to said housing through which said second intermediate shaft extends, and
  (i) a sixth bearing mounted to said housing through which said second intermediate shaft extends.

* * * * *